June 29, 1926.
T. C. KORSMO
1,590,246
MECHANICAL MOVEMENT
Filed Nov. 13, 1924   2 Sheets-Sheet 1
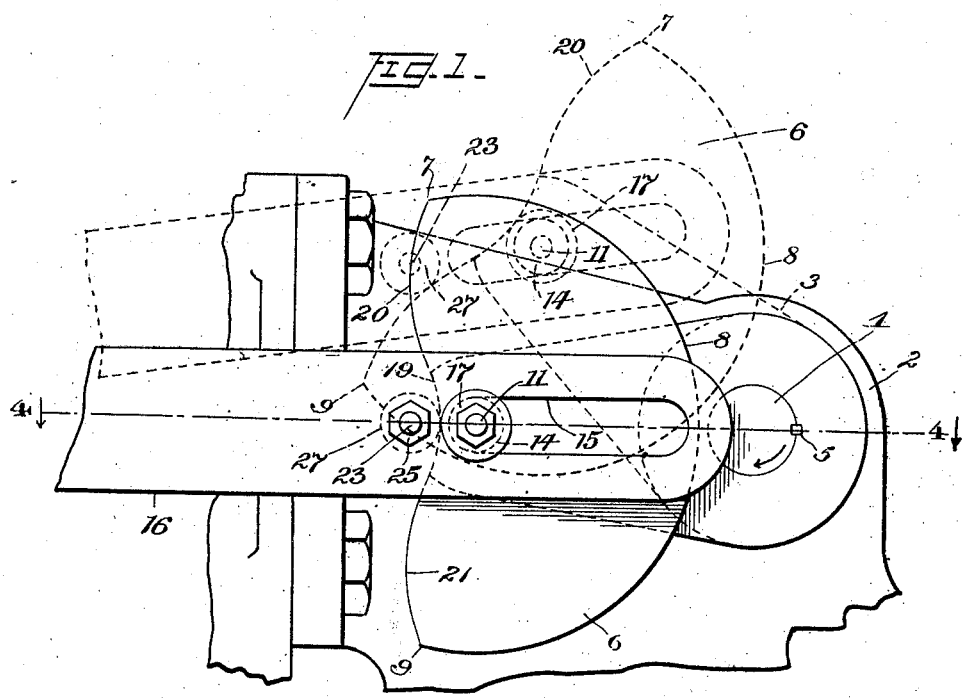
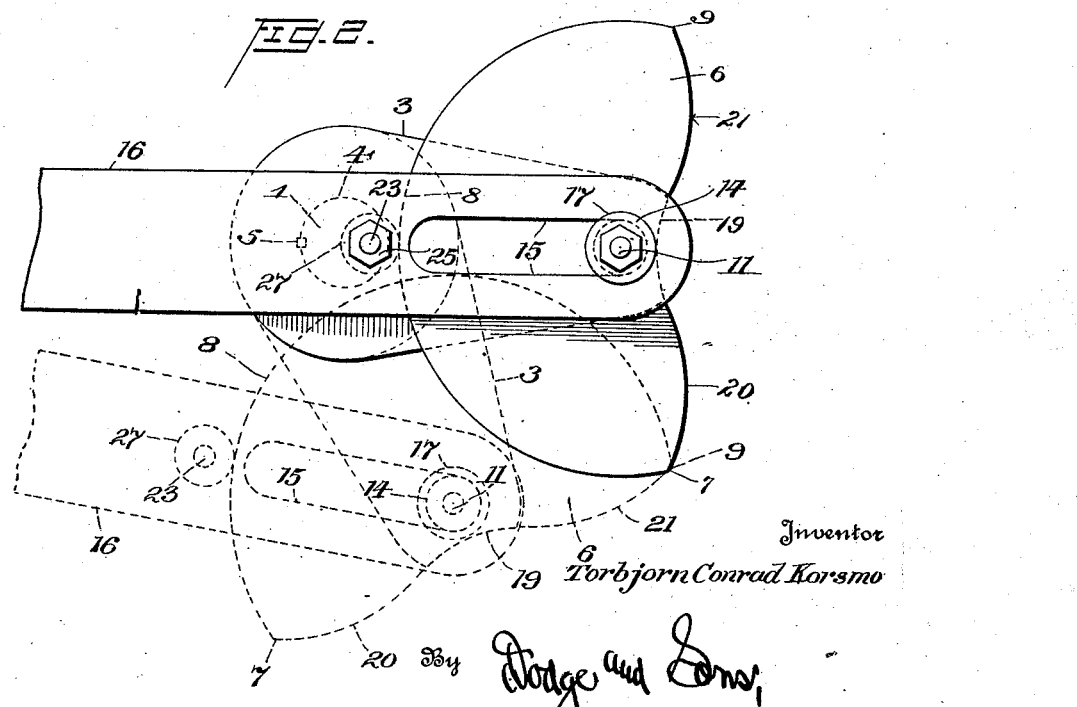
Inventor
Torbjorn Conrad Korsmo
By Dodge and Sons,
Attorneys

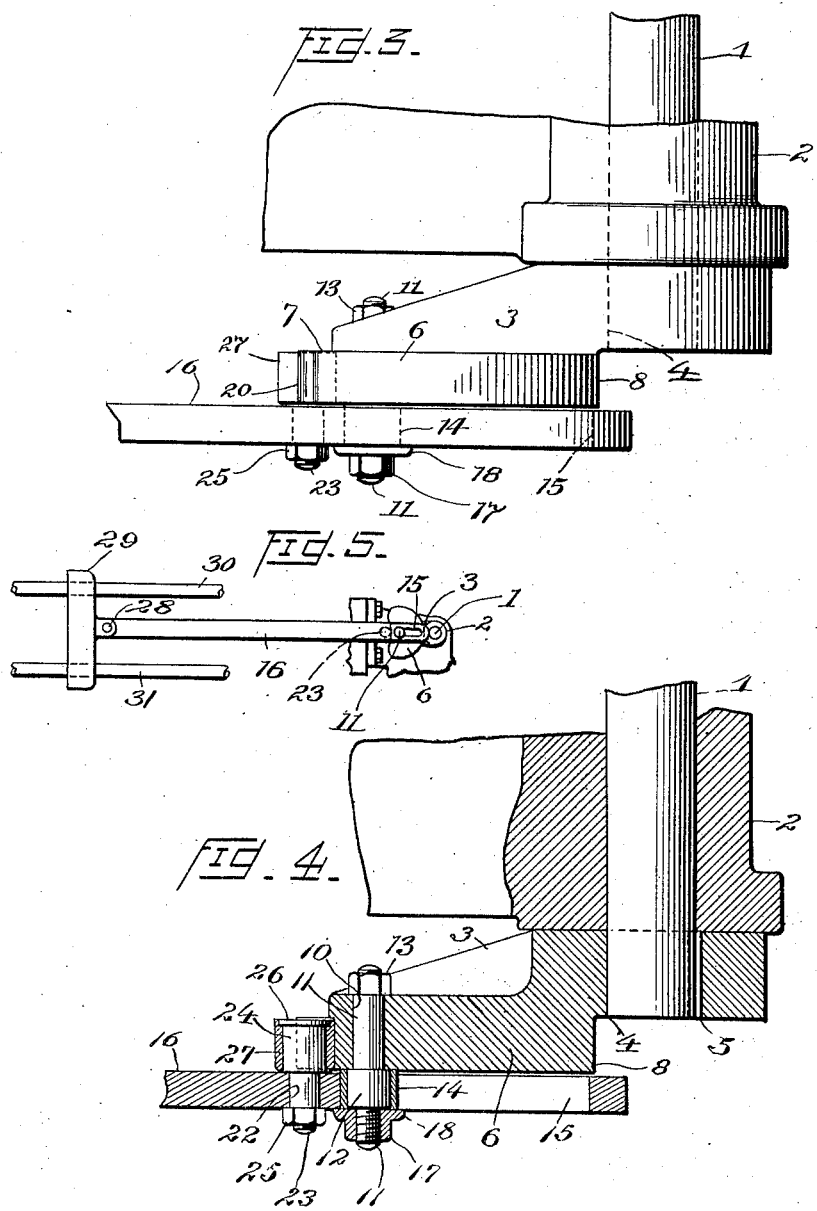

Patented June 29, 1926.

1,590,246

UNITED STATES PATENT OFFICE.

TORBJORN CONRAD KORSMO, OF MADISON, WISCONSIN, ASSIGNOR TO MADISON-KIPP CORPORATION, OF MADISON WISCONSIN, A CORPORATION OF WISCONSIN.

MECHANICAL MOVEMENT.

Application filed November 13, 1924. Serial No. 749,711.

This invention pertains to mechanical movements and particularly to that type of movement in which rotary motion is converted into reciprocatory motion.

Generally stated, the device comprises a crank and connecting rod having a pin and slot connection with each other, and a cam associated with the crank and coacting with a follower on the rod in such manner that through the major portion of the crank rotation the device acts as a simple crank and connecting rod, and throughout the remainder of the crank rotation the cam neutralizes the effect on the rod of the motion of the crank by controlling relative motion at the pin and slot connection, thus producing a dwell in the motion of the part driven by the connecting rod.

A feature of the invention is the rugged and simple construction by which it is feasible to produce a sudden transition from motion to rest and from rest to motion at the beginning and end of the dwell without injury to the mechanism. This feature is of importance in certain fields of use.

A practical embodiment of the invention, which is now being commercially used, is illustrated in the accompanying drawings, wherein like reference characters are used to indicate the same parts throughout the views.

Figure 1 represents a side elevation of the device, the parts being shown in full lines in their extreme left-hand or forward position, which is the position they assume in the middle of the dwell period of the movement and, in dotted lines, in a subsequent position during the dwell period, assuming the rotary parts move in a clockwise direction;

Fig. 2, a similar view, the parts being shown in full lines in their extreme right-hand or fully retracted position, which is diametrically opposite the central dwell position of Fig. 1, and, in dotted lines, in a subsequent position as the parts approach the positions which they assume during the dwell period, two of which are shown in Fig. 1;

Fig. 3, a plan view of the device as it appears in full lines in Fig. 1;

Fig. 4, a horizontal section taken on line 4—4 of the device as it appears in full lines in Fig. 1; and Fig. 5, a front elevational view of the movement and a body connected to and adapted to be reciprocated thereby, the parts being shown in the positions which they assume in the middle of the dwell period.

In the drawings, 1 is a shaft mounted for rotation, in either direction, in a bearing 2. For the purposes of description, it will be assumed that shaft 1 revolves in the direction indicated by the arrow on the end thereof, i. e., clockwise. The forward end of shaft 1 projects beyond the journal bearing 2 and carries a crank 3, which is apertured to receive the end of the shaft as indicated at 4 and which is fixed on the shaft by a key 5.

At the outer end of crank 3 and on the outer face thereof there is fixed a cam disk or plate 6. Preferably, it is formed integral with the crank as illustrated in the drawings.

Crank 3 and cam 6 are formed with an opening 10 to receive a pin 11, whose axis is parallel to the axis of shaft 1. The pin 11 is shouldered to form an enlarged journal 12 and is retained by a nut 13. A roller 14 is rotatably mounted on the journal 12 and is in effect the actual crank pin.

A longitudinal slot 15 in the crank end of connecting rod 16 receives the crank pin roller 14. The width of the slot is such as to afford only working clearance for the roller 14 and the length of roller 14 slightly exceeds the thickness of rod 16. The length of the slot conforms to the desired lost motion which occurs during the dwell between the rod and crank pin and the ends of the slot are arcuate to conform to the curvature of the roller 14 so that the roller will seat over substantially half its circumference at either end of the slot.

The outer end of the pin 11 is reduced and threaded, as shown, to receive a flanged nut 17, which seats against the resulting shoulder in pin 11, leaving working clearance at the end of roller 14 so that it is free to turn. The flange 18 on nut 17 is so dimensioned as to retain both roller 14 and rod 16 in position relatively to the pin 11 and journal 12.

The cam 6 is symmetrical with respect to the radial line connecting the center of crank pin 11 with the center of shaft 1. The portion 7, 8, 9 is arcuate, concentric with crank pin 11 and presented toward the axis of shaft 1. The remainder of the cam is specially derived to control the dwell and its exact form is a function of the length of the crank, the length of the connecting rod and the angle subtended by the arcuate portion 7, 8, 9, each of which will vary according to the particular requirements. The form for one particular case is illustrated in the drawings. Generally stated the dwell portion includes a central concave portion 19 and symmetrical convex portions 20 and 21 on either side thereof which intersect at sharp angles the arcuate portion 7, 8, 9 rather than merging gradually thereinto.

Mounted at 22 in connecting rod 16 in line with slot 15 and a short distance from the inner end thereof is the journal pin 23 for the cam follower roller 27 with its axis parallel with the axis of crank pin 11. The pin 23 is shouldered to provide a journal 24 for roller 27 and a reduced threaded shank which passes through the rod 16 and is held in place by a nut 25. A head or flange 26 integral with journal pin 23 retains the roller 27 on the pin.

The end of rod 16 remote from slot 15 is pivoted at 28 to a cross head 29 slidably mounted on guides 30 and 31. The line of reciprocation of pivot 28 passes through the axis of shaft 1.

When the shaft 1 rotates the cam 6 revolves relatively to roller 27 and rod 16. The parts are so dimensioned and arranged that while roller 27 is in contact with the arcuate portion 7, 8, 9 of cam 6, crank pin roller 14 will be held snugly in the outer end of slot 15. At such time therefore cross head 29 is moved by the rotation of shaft 1 just as it would be moved by a simple crank and connecting rod. On the other hand, while roller 27 travels in contact with the dwell portion of cam 6 between 7 and 9, the roller 14 moves from the outer to the inner end of slot 15 and back to the outer end, at such rates that cross head 29 remains at rest.

The transition from rest to motion and from motion to rest occurs suddenly, and at the end of the dwell roller 14 seats in the end of slot 15 and receives the impact necessary to start cross head 29 and rod 16 suddenly.

Such sudden starting is useful, particularly in die casting machines, where it has been found desirable to open the dies with a sudden jerk or impact which strips the casting from the dies. The mechanical movement is applied to the die casting machine in such manner that the dwell occurs while the dies are closed and the collision of the dies limits the motion of cross head 29 to the left (with reference to Fig. 5). At such time the dies are locked, since the dwell renders the drive irreversible. The opening impact occurs when roller 27 moves from the dwell portion to the arcuate portion of cam 6, at which time roller 14 seats in the end of slot 15. The impact is delivered through roller 14, which being seated over half its circumference in the arcuate end of slot 15, is adequate to withstand the shock without injury.

Advantages of the device are the mounting of the cam directly on the crank, so that it may be made integral with the crank; the arrangement of roller 14 as above described to permit commercial use of sudden transition between motion and dwell, and the arrangement of the parts so that the use of a disc cam, as contradistinguished from a slotted cam, is practicable.

Certain die casting machine combinations above alluded to in general terms are described and claimed in my copending applications, Serial No. 13,543, filed March 6, 1925, and Serial No. 86,285, filed February 5, 1926.

What I claim is:

1. In a dwell cam crank mechanism, the combination of a crank having a projecting crank pin; a connecting rod having a longitudinal slot near one end in which said pin works; guiding means for the other end of the rod; a cam follower mounted on said rod between said slot and the guided end of the rod; and a cam mounted directly on said crank, and coacting with the follower, said cam having an arcuate portion which when engaged by the follower confines said crank pin in the outer end of said slot, and a dwell portion which when engaged by said follower so shifts said crank pin in said slot that the guided end of said rod dwells, there being a sudden transition from the dwell portion of said cam to the arcuate portion.

2. In a dwell cam crank mechanism, the combination of a crank having a projecting crank pin; a connecting rod having a longitudinal slot near one end, in which said crank pin works, said slot being formed at its outer end to fit said pin; guiding means for the other end of the rod; a cam follower mounted in said rod between said slot and the guided end of the rod; and a member formed integrally with the crank and having a peripheral cam surface with which said follower coacts in unidirectional thrust relation, said cam surface having an arcuate portion, which when engaged by the follower confines said pin in the outer end of said slot, and a dwell portion which when engaged by the follower so shifts said crank pin in said slot that the guided end of said rod dwells, there being a sudden transition from the dwell portion of said cam surface to the arcuate portion.

In testimony whereof I have signed my name to this specification.

TORBJORN CONRAD KORSMO